United States Patent
Yan et al.

(10) Patent No.: US 12,312,455 B2
(45) Date of Patent: May 27, 2025

(54) MICROPOROUS POLYOLEFIN (PO) FOAMED MATERIAL

(71) Applicant: Ningbo Micro-foam Material Co., Ltd., Ningbo (CN)

(72) Inventors: Haikuo Yan, Ningbo (CN); Wushun Zhou, Ningbo (CN); Tingwei He, Ningbo (CN); Fajun Zhou, Ningbo (CN); Wei Zhang, Ningbo (CN); Shengchao Wang, Ningbo (CN)

(73) Assignee: NINGBO MICRO-FOAM MATERIAL CO., LTD., Ningbo (CN)

( * ) Notice: Subject to any disclaimer, the term of this patent is extended or adjusted under 35 U.S.C. 154(b) by 446 days.

(21) Appl. No.: 17/738,123

(22) Filed: May 6, 2022

(65) Prior Publication Data

US 2023/0203272 A1 Jun. 29, 2023

(30) Foreign Application Priority Data

Dec. 28, 2021 (CN) .............. 202111617247

(51) Int. Cl.
*C08J 9/14* (2006.01)
*C08K 5/06* (2006.01)

(52) U.S. Cl.
CPC ............. *C08K 5/06* (2013.01); *C08J 9/142* (2013.01); *C08J 2323/08* (2013.01); *C08J 2323/12* (2013.01)

(58) Field of Classification Search
CPC .... C08J 9/122; C08J 2203/08; C08J 2323/00; C08J 2205/044; C08J 9/142; C08J 2323/08; C08J 2323/12; C08J 2201/03; C08J 2323/16; C08J 9/0023; C08K 5/06; B29K 2023/00; B29K 2105/041; B29K 2995/0092; B29C 44/3453; Y02E 60/10
See application file for complete search history.

(56) References Cited

FOREIGN PATENT DOCUMENTS

| | | | | |
|---|---|---|---|---|
| CN | 112795091 A | * | 5/2021 | ............ C08J 9/0061 |
| JP | S59217733 | * | 12/1984 | |
| JP | 2011068821 A | * | 4/2011 | |
| JP | 2012014914 A | * | 1/2012 | |
| JP | 2013199658 A | * | 10/2013 | ......... B29C 35/0805 |
| JP | 2017066359 A | * | 4/2017 | |
| JP | 2018095816 A | * | 6/2018 | |

OTHER PUBLICATIONS

CN112795091A English Machine Translation (Year: 2021).*
JP2011068821A English Machine Translation (Year: 2011).*
JP2013199658A English Machine Translation (Year: 2013).*
JPS59217733 Machine Translation (Year: 1984).*
CN112795091A Machine Translation (Year: 2021).*
JP2017066359A Machine Translation (Year: 2017).*

* cited by examiner

*Primary Examiner* — K. Boyle
(74) *Attorney, Agent, or Firm* — Bayramoglu Law Offices LLC

(57) ABSTRACT

A microporous polyolefin (PO) foamed material is provided, which is prepared from a PO composition through a foaming process. The PO composition includes a PO and an additive composition, and the PO composition as 100 parts by mass, the additive composition accounts for 3 to 20 parts by mass. The additive composition includes a functional additive A; the functional additive A has a molecular formula of $R-(OCH_2CH_2)_{OH}$, where R is an aralkyl group, a straight alkyl chain, or a branched alkyl chain that has 5 to 60 carbon atoms, and x is 1 to 20; and an absolute value of a solubility parameter difference between the PO and the functional additive A is greater than or equal to 2.5 $(J/cm^3)^{1/2}$ and less than or equal to 5 $(J/cm^3)^{1/2}$.

5 Claims, No Drawings

MICROPOROUS POLYOLEFIN (PO) FOAMED MATERIAL

CROSS REFERENCE TO THE RELATED APPLICATIONS

This application is based upon and claims priority to Chinese Patent Application No.: 202111617247.4, filed on Dec. 28, 2021, the entire contents of which are incorporated herein by reference.

TECHNICAL FIELD

The present disclosure relates to the technical field of foamed materials, and in particular to a microporous polyolefin (PO) foamed material.

BACKGROUND

Polymer foamed materials refer to polymer-based microporous materials with numerous bubbles therein, and can also be regarded as composite materials with gas as a filler. Polymer foamed materials are widely used in many fields due to light weight, high specific strength, thermal insulation, buffer capacity, and other properties.

At present, the preparation of foamed materials is mainly achieved by chemical foaming and physical foaming. The chemical foaming generally adopts an azo foaming agent such as azodicarbonamide, and the foaming agent can be decomposed at a high temperature to generate a gas for foaming. This chemical foaming method will result in harmful gases and chemical residues during a foaming process. The traditional physical foaming refers to foaming a plastic by a physical method, that is, a thermodynamic state of a gas is gradually changed to introduce a gas, thereby producing bubbles in a polymer. Pores of a foamed material produced in this way are not uniform in size, resulting in unstable performance of the foamed material.

Supercritical gas foaming is also a physical foaming method, but is quite different from the traditional physical foaming. In a supercritical gas foaming process, a thermodynamic state changes rapidly, and a nucleation rate and a nucleus number are significantly larger than those of the general physical foaming. In addition, a supercritical gas has a high mass transfer coefficient, and thus a concentration equilibrium can be achieved in a relatively short time period, which shortens the processing time. Carbon dioxide and nitrogen are adopted as foaming agents because they are environmentally friendly, non-polluting to the environment, and prone to critical conditions, and show a strong permeation and dissolution ability in polymers, which helps to improve a foaming effect.

The uniformity of a foamed material is the most important performance parameter of the foamed material. Currently, when the supercritical gas foaming method is used to prepare a foamed material of a polymer, especially a PO material, the acquisition of the foamed material with prominent uniformity usually requires a long-term saturation process. The extension of foaming time lowers the foaming efficiency, which greatly increases a cost of a foamed material product. If a saturation process is shortened to reduce the cost, it easily results in an unstable quality of the foamed material product, such as incomplete foaming and uneven foaming, and may even produce a foamed material with a sharply decreased quality because some areas not to be foamed.

Therefore, in order to improve the foaming efficiency and reduce the foaming cost on the premise of ensuring a quality of a foamed material, it is necessary to conduct corresponding technical improvements on the current foaming processes for foamed materials.

SUMMARY

The present disclosure is intended to provide a microporous PO foamed material and a corresponding preparation method thereof, which solve the problems that the foaming efficiency for the current microporous PO foamed material is not high enough and the foaming uniformity caused by only shortening the foaming time affects a quality of a foamed material.

In order to solve the above-mentioned technical problems, the present disclosure adopts the following technical solutions: a microporous PO foamed material is provided, which is prepared from a PO composition through a foaming process, where the PO composition includes a PO and an additive composition, and with the PO composition as 100 parts by mass, the additive composition accounts for 3 to 20 parts by mass; the additive composition includes a functional additive A; the functional additive A has a molecular formula of $R-(OCH_2CH_2)_xOH$, where R is an aralkyl group, a straight alkyl chain, or a branched alkyl chain that has 5 to 60 carbon atoms, and x is 1 to 20; and an absolute value of a solubility parameter difference between the PO and the functional additive A is greater than or equal to 1 $(J/cm^3)^{1/2}$ and less than or equal to 5 $(J/cm^3)^{1/2}$.

In this solution, the functional additive A is introduced on the basis of the traditional conventional supercritical gas foaming process. The traditional supercritical gas foaming does not require an additive, that is, in the current conventional supercritical gas foaming, a supercritical gas is directly used to foam a PO resin. Due to a different foaming principle, the foaming efficiency of the supercritical gas foaming is much higher than that of other foaming processes. However, the foaming efficiency of the supercritical gas foaming process can be further improved.

In the method adopted in this solution, a specified amount of a functional additive is added during a supercritical gas foaming process, such as to improve the foaming efficiency on the premise of ensuring the foaming quality. Specifically, a function mechanism is as follows: at a saturation stage of the foaming process, the functional additive A can migrate in the PO resin, and the migration of the functional additive helps to form a permeation channel of a supercritical fluid in the resin system, which promotes an increase in the permeation rate, thereby reducing the saturation time and ultimately increasing the foaming efficiency. In addition, in this solution, the functional additive A can migrate to a surface of the foamed material to achieve the purpose of improving the hydrophilicity of the foamed material.

As a further solution, the PO may be polypropylene (PP) or polyethylene (PE).

As a further solution, the functional additive A may have a molecular formula of $R-(OCH_2CH_2)_xOH$ where R is a straight alkyl chain with 5 to 30 carbon atoms and x is 1 to 10.

As a further solution, the functional additive A may have a molecular weight of 300 g/mol to 1,000 g/mol.

As a further solution, the absolute value of the solubility parameter difference between the PO and the functional additive A may be greater than or equal to 1 $(J/cm^3)^{1/2}$ and less than or equal to 3 $(J/cm^3)^{1/2}$.

The PO of the present disclosure may preferably be PE and PP from the viewpoint of industrial availability. The PE can be linear low-density PE, low-density PE, medium-density PE, high-density PE, and an ethylene-octene multi-block copolymer; and the PP can be a PP homopolymer, a PP random copolymer, a PP block copolymer, and a PP elastomer. In addition, the PE can also include a high-pressure ethylene copolymer such as an ethylene vinyl acetate interpolymer, an ethylene acrylic acid (EAA) interpolymer, an ethyl vinyl acetate interpolymer, an ethylene methacrylic acid (EMAA) interpolymer, an EMAA ionomer, and the like.

From the viewpoint of improving a migration speed of the functional additive A in the resin system, R may be preferably a straight or branched alkyl chain with 5 to 30 carbon atoms and more preferably a straight alkyl chain with 5 to 30 carbon atoms, and x may be 1 to 10.

The molecular weight of the functional additive A may usually be higher than or equal to 200 g/mol and lower than or equal to 2,000 g/mol. From the viewpoint of the migration of the functional additive A in the resin system, the molecular weight of the functional additive A may preferably be higher than or equal to 300 g/mol and lower than or equal to 1,000 g/mol. When the functional additive A is a mixture, that is, when the number of carbon atoms in R or x in the functional additive R—$(OCH_2CH_2)_xOH$ takes different values, an average molecular weight of the functional additive A may be higher than or equal to 300 g/mol and lower than or equal to 1,000 g/mol. The molecular weight of the functional additive A can be determined by supercritical fluid chromatography (SFC).

With the PO composition as 100 parts by mass, the functional additive A may be added in preferably 3 to 20 parts by mass and more preferably 3 to 10 parts by mass. A content of the functional additive A within this range can not only effectively control the production cost, but also ensure that the functional additive A plays a role in assisting the permeation of the supercritical fluid in the PO resin.

As a further solution, the additive composition may further include an additive B, and the additive B may be one or two selected from the group consisting of lauric acid diethanolamide and ethylene bis stearamide (EBS).

In the relevant pilot tests, it is found that the additive B can effectively increase a content of carbon dioxide in the PO resin during the foaming saturation process. With the additive composition as 100 parts by mass, the additive B may generally be added in 5 to 20 parts by mass. A content of the additive B within this range will not affect a migration rate of the functional additive A in PO and can effectively increase the content of carbon dioxide in PO during a saturation process of a PO blank.

The solubility parameter is a specific property of a substance, and a value thereof is related to the cohesive energy and molar volume of the substance. In the present disclosure, the cohesive energy is calculated by the method proposed by Fedors.

$$\delta = (\Sigma \Delta E_i / \Sigma \Delta V_i)^{1/2} \quad \text{(Formula 1)}$$

where $\Delta E_i$ and $\Delta V_i$ represent the cohesive energy density of the group and the molar volume of the group, respectively.

The solubility parameter of PO is represented by SP1 ($\delta_{polymer}$), and if the resin is obtained by copolymerization of multiple monomers (m is an integer greater than 2), the solubility parameter can be calculated by the following formula:

$$\delta_{polymer} = X_1\delta_1 + X_2\delta_2 + \ldots + X_m\delta_m \quad \text{(Formula 2)},$$

where $X_1$, $X_2$, and ..., $X_n$ each represent a mole percentage (%) of a monomer in the resin; $X_1+X_2+\ldots+X_n=1$; and $\delta_1$, $\delta_2$, ..., and $\delta_n$ each represent a solubility parameter of a monomer unit in the resin.

If the functional additive A used in the present disclosure is a single functional additive, the solubility parameter SP2 of the functional additive A is calculated by the Formula 1. The functional additive A of the present disclosure can also be a mixture of functional additives, that is, when the number of carbon atoms in R or x of the functional additive R—$(OCH_2CH_2)_xOH$ can take different values to obtain a functional additive mixture, in which case the solubility parameter SP2 of the functional additive A can be calculated by the following formula:

$$\delta_{ave} = Y_1\delta_1 + Y_2\delta_2 + \ldots + Y_m\delta_m \quad \text{(Formula 3)}$$

where $Y_1$, $Y_2$, and ..., $Y_n$ each represent a mass (%) of a functional additive in the functional additive mixture; $Y_1+Y_2+\ldots+Y_n=100\%$; and $\delta_1$, $\delta_2$, ..., and $\delta_n$ each represent a solubility parameter of a functional additive in the functional additive mixture.

Generally, since the main chain of PO is a saturated hydrocarbon structure, if there is no polar side group, a value of the solubility parameter is small.

However, due to the presence of polar groups, the functional additive A usually has a larger solubility parameter than PO. An absolute value of a difference between the solubility parameter (SP1) of the PO and the solubility parameter (SP2) of the functional additive A is greater than or equal to 1 $(J/cm^3)^{1/2}$ and less than or equal to 5 $(J/cm^3)^{1/2}$, such that, at a saturation stage of the foaming process, the functional additive A can migrate in the PO resin, and the migration of the functional additive helps to form a permeation channel of a supercritical fluid in the resin system, which promotes an increase in the permeation rate, thereby reducing the saturation time and increasing the foaming efficiency. Preferably, the absolute value of the difference between the solubility parameter (SP1) of the PO and the solubility parameter (SP2) of the functional additive A may be greater than or equal to 1 $(J/cm^3)^{1/2}$ and less than or equal to 3 $(J/cm^3)^{1/2}$.

If the absolute value of the difference between the solubility parameter (SP1) of the PO and the solubility parameter (SP2) of the functional additive A is too small, the compatibility between the PO and the functional additive is prominent, and thus the functional additive A will migrate in the PO resin at a very low rate, and may even not migrate. On the contrary, if the absolute value of the difference between the solubility parameter (SP1) of the PO and the solubility parameter (SP2) of the functional additive A is too large, the compatibility between the functional additive A and the PO resin is poor, and thus when a mixed material is extruded by a twin-screw extruder to obtain a blank, it is prone to non-thorough mixing (the functional additive A is present in the PO composition in the form of island-like aggregates), and the functional additive A may even enrich on the surface of the extruded blank. In this case, although the functional additive A has a strong migration ability, it is difficult to construct an effective migration channel for the supercritical fluid, such that the increase in the permeation rate of the supercritical fluid is not obvious.

The microporous PO foamed material of the present disclosure may be prepared by the following steps:
(1) the PO composition is subjected to blended-extrusion by a twin-screw extruder to obtain a blank;
(2) the blank is placed in a high-pressure container and heated to a saturation temperature, a supercritical fluid is introduced to achieve a saturation pressure, and then the saturation temperature and pressure are kept for 10 min to 300 min, where the saturation temperature is Tm−50° C. to Tm and the saturation pressure is 5 MPa to 30 MPa; and (3) the high-pressure container is subjected to pressure release to obtain the foamed material.

The Tm is a melting point of the PO.

A shape of the blank is not particularly limited, and the blank may be a plate, a film, a granular material, or the like.

Compared with the prior art, the present disclosure has the following beneficial effects.

(1) The foaming efficiency is greatly improved, with an increase of 15% or higher. Through the improvement of the foaming efficiency, the foaming time is reduced. The foaming efficiency can be determined by measuring an amount of a supercritical fluid in a sample after different samples with the same size are treated under the same temperature, the same pressure, and the same saturation time, that is, the higher the amount of the supercritical fluid in the sample, the higher the foaming efficiency.

(2) With the foaming method in the present disclosure, a foamed material with prominent uniformity can be prepared in a short saturation time, which improves the foaming efficiency of the foamed material and reduces the product cost.

(3) The hydrophilicity of the foamed material can be improved by allowing the functional additive A to migrate to the surface of the foamed material, thereby improving a bonding strength between the foamed material and an adhesive.

DETAILED DESCRIPTION OF THE EMBODIMENTS

The solutions of the present disclosure will be further described. It should be understood that the following description is not intended to limit the embodiments to a preferred embodiment. On the contrary, it is intended to cover alternatives, modifications, and equivalents that can be included within the spirit and scope of the embodiments defined by the appended claims.

Example 1

A PO composition includes: PE (ethylene-octene random copolymerization; a molar proportion of the octene monomer is 10.1%; Tm is 65° C.; a mass fraction is 97%; and a solubility parameter SP1 is 17.1 $(J/cm^3)^{1/2}$) and a functional additive A1 ($C_{22}H_{45}$—$(OCH_2CH_2)_2OH$; a mass fraction is 3%; R is a straight-chain alkyl group; and a solubility parameter SP2 is 19.0 $(J/cm^3)^{1/2}$). An absolute value of a solubility parameter difference between the PO composition and the functional additive A1 is 1.9 $(J/cm^3)^{1/2}$. The PO composition was subjected to blended-extrusion by a twin-screw extruder to obtain a block-like plate blank with a thickness of 5 mm.

The blank was placed in a high-pressure container and heated to a saturation temperature, supercritical carbon dioxide was introduced to achieve a saturation pressure, then the saturation temperature and pressure were kept for 150 min, and then the high-pressure container was subjected to pressure release to obtain a foamed material, where the saturation temperature was 60° C. and the saturation pressure was 10 MPa.

A surface of the blank was observed through visual inspection, and it was found that no additive was enriched on the surface. A side section of the foamed sample was observed, and it could be seen that the foaming of the foamed sample was uniform as a whole. By comparing densities of the foamed sample before and after foaming, a foaming ratio was calculated to be about 6.2.

Determination of a carbon dioxide adsorption capacity in the blank: Two identical blank sheets (8 cm*4 cm*0.5 cm) were respectively placed in two 1 L high-pressure reactors, and the reactors were purged with $CO_2$ to replace the original air in the reactor. The two high-pressure reactors were simultaneously heated to 60° C. and kept at the temperature for 30 min, and after the blank sheet reached 60° C., 10 MPa supercritical carbon dioxide was introduced into the two reactors, and saturation was allowed for a specified period of time at this temperature and pressure (if the pressure exceeded 10 MPa, the pressure release was conducted appropriately through a manual valve to adjust a gas pressure in the reactor to 10 MPa). The saturation in one of the reactors was conducted for 90 min, and the saturation in the other one was conducted for 150 min. After the saturation was completed, the reactors were immediately cooled with running water for 3 min and then placed in an ice water bath for 7 min, then the pressure was slowly released, the sample was taken out and immediately weighed on a high-accuracy balance, and a weight change thereof over time was recorded. The whole process from taking out the blank sheet from the reactor to placing the blank sheet on the balance was controlled within 1 min. With this method, an amount of carbon dioxide dissolved in the blank sheet after 90 min and 150 min of saturation could be measured. Each sample was measured 3 times, and then an average value was taken.

The measured amount of carbon dioxide dissolved in the blank sheet is as follows: 5.6 g/100 g blank after 90 min of saturation; and 7.8 g/100 g blank after 150 min of saturation.

Example 2: This example is different from Example 1 only in that the functional additive A1 is replaced by the functional additive A2 ($C_{10}H_{23}$—$(OCH_2CH_2)_4OH$; R is a straight-chain alkyl group; a mass fraction is 3%; and SP2 is 20.1 $(J/cm^3)^{1/2}$).

A surface of the blank obtained in Example 2 was observed, and it was found that no additive was enriched on the surface. A side section of the foamed sample was observed, and it could be seen that the foaming of the foamed sample was uniform as a whole. By comparing densities of the foamed sample before and after foaming, a foaming ratio was calculated to be about 6.5.

The measured amount of carbon dioxide dissolved in the blank sheet is as follows: 5.8 g/100 g blank after 90 min of saturation; and 8.4 g/100 g blank after 150 min of saturation.

Example 3: This example is different from Example 2 only in that the composition and mass fraction of the PO composition are adjusted appropriately (in Example 3, composition of the PO composition: ethylene-octene random copolymerization, 96.7%; a functional additive A2: 3%; and an additive B1: EBS, 0.3%).

A surface of the blank obtained in Example 3 was observed, and it was found that no additive was enriched on the surface. A side section of the foamed sample was observed, and it could be seen that the foaming of the foamed sample was uniform as a whole. By comparing densities of the foamed sample before and after foaming, a foaming ratio was calculated to be about 6.9.

The measured amount of carbon dioxide dissolved in the blank sheet is as follows: 6.1 g/100 g blank after 90 min of saturation; and 8.7 g/100 g blank after 150 min of saturation.

Example 4: The PO block-like blank prepared in Example 2 was placed in a high-pressure container and heated to a saturation temperature, nitrogen was introduced to achieve a saturation pressure, then the saturation temperature and pressure were kept for 150 min, and then the high-pressure container was subjected to pressure release to obtain a foamed material, where the saturation temperature was 60° C. and the saturation pressure was 25 MPa.

A surface of the blank was observed through visual inspection, and it was found that no additive was enriched on the surface. A side section of the foamed sample was observed, and it could be seen that the foaming of the foamed sample was uniform as a whole. By comparing densities of the foamed sample before and after foaming, a foaming ratio was calculated to be about 4.9.

Determination of a nitrogen adsorption capacity in the blank: Two identical blank sheets (8 cm*4 cm*0.5 cm) were respectively placed in two 1 L high-pressure reactors, and the reactors were purged with $N_2$ to replace the original air in the reactor. The two high-pressure reactors were simultaneously heated to 60° C. and kept at the temperature for 30 min, and after the blank sheet reached 60° C., 25 MPa supercritical carbon dioxide was introduced into the two reactors, and saturation was allowed for a specified period of time at this temperature and pressure (if the pressure exceeded 25 MPa, the pressure release was conducted appropriately through a manual valve to adjust a gas pressure in the reactor to 25 MPa). The saturation in one of the reactors was conducted for 90 min, and the saturation in the other one was conducted for 150 min. After the saturation was completed, the reactors were immediately cooled with running water for 3 min and then placed in an ice water bath for 7 min, then the pressure was slowly released, the sample was taken out and immediately weighed on a high-accuracy balance, and a weight change thereof over time was recorded. The whole process from taking out the blank sheet from the reactor to placing the blank sheet on the balance was controlled within 1 min. With this method, an amount of nitrogen dissolved in the blank sheet after 90 min and 150 min of saturation could be measured. Each sample was measured 3 times, and then an average value was taken.

The measured amount of nitrogen dissolved in the blank sheet is as follows: 4.4 g/100 g blank after 90 min of saturation; and 6.1 g/100 g blank after 150 min of saturation.

Example 5: A PO composition includes: PP (propylene-ethylene copolymer; a molar proportion of the ethylene monomer is 3.1%; Tm is 155° C.; a mass fraction is 97%; and SP1 is 17.4 $(J/cm^3)^{1/2}$) and a functional additive A2 (a mass fraction is 3% and SP2 is 20.1 $(J/cm^3)^{1/2}$). An absolute value of a solubility parameter difference between the PO composition and the functional additive A2 is 2.7 $(J/cm^3)^{1/2}$. The PO composition was subjected to blended-extrusion by a twin-screw extruder to obtain a block-like plate blank with a thickness of 5 mm.

The blank was placed in a high-pressure container and heated to a saturation temperature, supercritical carbon dioxide was introduced to achieve a saturation pressure, then the saturation temperature and pressure were kept for 60 min, and then the high-pressure container was subjected to pressure release to obtain a foamed material, where the saturation temperature was 150° C. and the saturation pressure was 10 MPa.

A surface of the blank obtained in Example 5 was observed, and it was found that no functional additive was enriched on the surface. A side section of the foamed sample was observed, and it could be seen that the foaming of the foamed sample was uniform as a whole. By comparing densities of the foamed sample before and after foaming, a foaming ratio was calculated to be about 18.2.

Determination of a carbon dioxide adsorption capacity in the blank: Two identical blank sheets (8 cm*4 cm*0.5 cm) were respectively placed in two 1 L high-pressure reactors, and the reactors were purged with CO2 to replace the original air in the reactor. The two high-pressure reactors were simultaneously heated to 150° C. and kept at the temperature for 30 min, and after the blank sample reached 150° C., 10 MPa supercritical carbon dioxide was introduced into the two reactors, and saturation was allowed at this temperature and pressure (if the pressure exceeded 10 MPa, the pressure release was conducted appropriately through a manual valve to adjust a gas pressure in the reactor to 10 MPa). The saturation in one of the reactors was conducted for 30 min, and the saturation in the other one was conducted for 60 min. After the saturation was completed, the reactors were immediately cooled with running water for 3 min and then placed in an ice water bath for 7 min, then the pressure was slowly released, the sample was taken out and weighed on a high-accuracy balance, and a weight change thereof over time was recorded. The whole process from taking out the blank sheet from the reactor to placing the blank sheet on the balance was controlled within 1 min. With this method, an amount of carbon dioxide dissolved in the blank sheet after 30 min and 60 min of saturation could be measured. Each sample was measured 3 times, and then an average value was taken.

The measured amount of carbon dioxide dissolved in the blank sheet is as follows: 6.3 g/100 g blank after 30 min of saturation; and 8.6 g/100 g blank after 60 min of saturation.

Example 6: This example is different from Example 5 only in that the composition and mass fraction of the PO composition are adjusted appropriately (in Example 6, composition of the PO composition: propylene-ethylene copolymer, 96.7%; a functional additive A2: 3%; and an additive B2: lauric acid diethanolamide: 0.3%).

A surface of the blank obtained in Example 6 was observed, and it was found that no additive was enriched on the surface. A side section of the foamed sample was observed, and it could be seen that the foaming of the foamed sample was uniform as a whole. By comparing densities of the foamed sample before and after foaming, a foaming ratio was calculated to be about 22.1.

The measured amount of carbon dioxide dissolved in the blank sheet is as follows: 6.9 g/100 g blank after 30 min of saturation; and 9.2 g/100 g blank after 60 min of saturation.

Example 7

This example is different from Example 5 only in that the functional additive A2 is replaced by the functional additive A3 ($C_{30}H_{61}$—$(OCH_2CH_2)_8OH$; R is a straight-chain alkyl group; and SP2 is 18.9 $(J/cm^3)^{1/2}$); and an absolute value of a solubility parameter difference between the PO composition and the functional additive A3 is 1.5 $(J/cm^3)^{1/2}$.

A surface of the blank obtained in Example 7 was observed, and it was found that no additive was enriched on the surface. A side section of the foamed sample was observed, and it could be seen that the foaming of the foamed sample was uniform as a whole. By comparing densities of the foamed sample before and after foaming, a foaming ratio was calculated to be about 15.8.

The measured amount of carbon dioxide dissolved in the blank sheet is as follows: 5.2 g/100 g blank after 30 min of saturation; and 7.1 g/100 g blank after 60 min of saturation.

Comparative Example 1: This comparative example is different from Example 1 only in that the PO composition is 100% PE (ethylene-octene random copolymerization; a molar proportion of the octene monomer is 10.1%; Tm is 65° C.; and SP1 is 17.1 $(J/cm^3)^{1/2}$).

The volume of the final sample is almost unchanged, and the sample is only whitened internally. According to densities before and after the foaming, the foaming ratio is about 1.1. The measured amount of carbon dioxide dissolved in the blank sheet is as follows: 4.8 g/100 g blank after 90 min of saturation; and 6.4 g/100 g blank after 150 min of saturation.

Under the same foaming conditions as above, if the temperature and pressure holding time in Comparative Example 1 is extended from 150 min to 220 min, a foamed sample with uniform foaming can also be obtained, and a foaming ratio is about 6.3. It can be seen that, for the preparation of a foamed sample with uniform foaming, after the functional additive A is added, the temperature and pressure holding time can be significantly shortened, indicating that the addition of the functional additive A can significantly improve the foaming efficiency.

Comparative Example 2: This comparative example is different from Example 5 only in that the PO composition is 100% PP (propylene-ethylene copolymer; a molar proportion of the ethylene monomer is 3.1%; Tm is 155° C.; a mass fraction is 97%; and SP1 is 17.4 $(J/cm^3)^{1/2}$).

The sample of Comparative Example 2 can be foamed. However, from the observation of a side section of the foamed sample, it can be seen that a central part of the foamed sample is not foamed, which may be because the 60 min of saturation at a saturation temperature of 150° C. and a saturation pressure of 10 MPa is not enough to allow the diffusion of supercritical carbon dioxide to the central part of the sample. By comparing densities of the foamed sample before and after foaming, a foaming ratio was calculated to be about 10.1.

The measured amount of carbon dioxide dissolved in the blank sheet is as follows: 4.4 g/100 g blank after 30 min of saturation; and 5.6 g/100 g blank after 60 min of saturation.

Comparative Example 3: This comparative example is different from Example 5 only in that the functional additive A2 is replaced by the functional additive A4 ($C_{52}H_{105}$—($OCH_2CH_2$)$_2OH$; R is a straight-chain alkyl group; and SP2 is 18.2 $(J/cm^3)^{1/2}$); and an absolute value of a solubility parameter difference between the PO composition and the functional additive A4 is 0.8 $(J/cm^3)^{1/2}$.

The sample of Comparative Example 3 can be foamed. By comparing densities of the foamed sample before and after foaming, a foaming ratio was calculated to be about 13.3. However, from the observation of a side section of the foamed sample, it can be seen that some areas in a central part of the foamed sample are not foamed. Although unfoamed areas of Comparative Example 3 are obviously less than unfoamed areas of Comparative Example 2, there are still unfoamed areas. This may be because the 60 min of saturation at a saturation temperature of 150° C. and a saturation pressure of 10 MPa is still not enough to make the supercritical carbon dioxide uniformly permeate the entire blank sheet.

In Comparative Example 3, although the functional additive is added, the absolute value of the solubility parameter difference between the PO composition and the functional additive is only 0.8 $(J/cm^3)^{1/2}$. Since the solubility parameter difference is too small, the functional additive A migrates in the PO at a too low rate, and thus does not play a role in assisting the permeation of supercritical carbon dioxide in the blank.

The measured amount of carbon dioxide dissolved in the blank sheet is as follows: 4.7 g/100 g blank after 30 min of saturation; and 6.2 g/100 g blank after 60 min of saturation.

Comparative Example 4: This comparative example is different from Example 5 only in that the functional additive A2 is replaced by the functional additive A5 (diisobutyl phthalate (DIBP), SP2 is 23.5 $(J/cm^3)^{1/2}$); and an absolute value of a solubility parameter difference between the PO composition and the additive is 6.1 $(J/cm^3)^{1/2}$.

From the observation of a surface of the blank, it can be seen that there is an obvious oily substance on the surface, indicating that the additive cannot be well blended with PP, there is obvious phase separation, and the additive is partly enriched on the surface, which is mainly because the too-large absolute value of the solubility parameter difference between the PO composition and the additive makes the compatibility between the PO composition and the additive poor. Because the compatibility between the PO composition and the additive is poor, the additive cannot be well dispersed in the PP resin. Even if present inside the PP resin, the additive usually exists in the form of island-like aggregates. When the saturation is conducted at 150° C., due to the large solubility parameter difference between the PO composition and the additive, the additive tends to migrate outwards. However, since existing in the form of islands in the PO composition, the additive can migrate, but fails to form an effective channel for carbon dioxide permeation. Therefore, the effect of improving the carbon dioxide permeation rate is very limited, which can also be verified by the amount of carbon dioxide dissolved in the blank sheet and the foaming ratio.

The sample of Comparative Example 4 can be foamed, and the foaming ratio is 12.9. From the observation of a side section of the foamed sample, it can be seen that unfoamed areas can still be observed in a central part of the foamed sample.

The measured amount of carbon dioxide dissolved in the blank sheet is as follows: 4.6 g/100 g blank after 30 min of saturation; and 5.9 g/100 g blank after 60 min of saturation.

Comparative Example 5: This comparative example is different from Example 4 only in that the PO composition is 100% PE (ethylene-octene random copolymerization; a molar proportion of the octene monomer is 10.1%; Tm is 65° C.; and SP1 is 17.1 $(J/cm^3)^{1/2}$). The volume of the final sample is basically unchanged, but the sample is whitened internally. According to densities before and after the foaming, the foaming ratio is about 1.2. The measured amount of nitrogen dissolved in the blank sheet is as follows: 3.4 g/100 g blank after 90 min of saturation; and 5.2 g/100 g blank after 150 min of saturation.

In summary, the following conclusions are drawn in conjunction with Examples 1 to 7 and Comparative Examples 1 to 5 of the present disclosure:

In Examples 1 and 2, PE and the functional additive A are used for foaming; in Example 3, PE, the functional additive A, and the additive B are used for foaming; and in Comparative Example 1, 100% PE is used for foaming. It can be seen from the comparison of these examples that:

Under a same saturation time, the foaming ratio of Comparative Example 1 is only 1.1, and the sample of Comparative Example 1 is only whitened internally. Apparently, in such a short period of time, the foaming is unqualified. After the functional additive A is introduced into PE, the foaming efficiency of PE is greatly improved. Under the same saturation time, the foaming ratio of Comparative Example 1 is 1.1, but the foaming ratios of Examples 1 and 2 respectively reach 6.2 and 6.5. Although the material in Comparative Example 1 can achieve the expected foaming ratio by extending the saturation time, the saturation time is obviously much longer than the saturation time provided by the method of the present disclosure. The foaming efficiency of Comparative Example 1 is obviously lower than that of the solution provided by the present disclosure.

After the additive B is introduced on the basis of the introduction of the functional additive A into PE, the foaming ratio of PE is further improved (reaching 6.9) under a same saturation time. It can be seen that the foaming efficiency is significantly improved after the introduction of the functional additive A, and the foaming efficiency can be further improved after the introduction of the additive B.

In Examples 5 and 7, PP and the functional additive A are used for foaming; in Example 6, PP, the functional additive A, and the additive B are used for foaming; and in Comparative Example 2, 100% PP is used for foaming. It can be seen from the comparison of these examples that:

After the functional additive A is introduced into PP, the foaming ratio of PP is greatly improved. Under a same saturation time, the foaming ratio is 10.1 and there are obvious unfoamed areas in Comparative Example 2, but the foaming ratios respectively reach 18.2 and 15.8 and the foaming is uniform in Examples 5 and 7. After the additive B is introduced on the basis of the introduction of the functional additive A into PP, the foaming ratio of PP is further improved to 22.1. Apparently, under a same foaming time, the foaming efficiency is significantly improved after the introduction of the functional additive A into PP and the foaming efficiency can be further improved after the further introduction of the additive B.

Example 5, Comparative Example 3, and Comparative Example 4 adopt different functional additives A.

The absolute value of the solubility parameter difference between PP and the functional additive A in Comparative Example 3 (0.8 $(J/cm^3)^{1/2}$) is less than 1 $(J/cm^3)^{1/2}$, and the absolute value of the solubility parameter difference between PP and the functional additive A in Comparative Example 4 (6.1 $(J/cm^3)^{1/2}$) is greater than 5 $(J/cm^3)^{1/2}$.

In principle, both a too-small absolute value of the solubility parameter difference and a too-large absolute value of the solubility parameter difference show adverse effects on foaming. Under a same saturation time, the foaming ratio of Comparative Example 3 is about 13.3 and the foaming ratio of Comparative Example 4 is about 12.9, which are significantly different from the foaming ratio of 18.2 in Example 5. Under a same saturation time, unfoamed areas can be observed in a central part of each of the foamed samples in Comparative Examples 3 and 4.

The results show that, although the addition of the functional additive A in Comparative Examples 3 and 4 improves the foaming efficiency of PP to some extent, the foaming efficiency still needs to be improved because the small absolute value of the solubility parameter difference and the large absolute value of the solubility parameter difference result in limited improvement on the foaming efficiency, that is, the materials of Comparative Examples 3 and 4 are still not fully foamed under a same saturation time.

This also proves that the functional additive A needs to be selected properly, and the functional additive A can greatly promote the foaming of a PO material only under corresponding conditions.

In addition, test data of the amount of carbon dioxide dissolved in each of the blank sheets of different examples under a same saturation time show the same trend, which also supports the above conclusion.

Examples 1 to 3 and 5 to 7 and Comparative Examples 1 to 4 adopt carbon dioxide for foaming, and Example 4 and Comparative Example 5 adopt nitrogen for foaming. It can be seen from the results of Example 4 and Comparative Example 5 that, with the assistance of the functional additive A, the saturation time of foaming is also shortened, thereby improving the foaming efficiency.

For the foamed material prepared by the above solution provided in the present disclosure, the foaming efficiency is greatly improved, with an increase of 15% or higher; through the improvement of the foaming efficiency, the foaming time is reduced; and the foaming efficiency can be determined by measuring an amount of a supercritical fluid in each sample with the same size after being treated under the same temperature, the same pressure, and the same saturation time, which further confirms the improvement of the foaming efficiency. With the foaming method in the present disclosure, a foamed material with prominent uniformity can be prepared in a short saturation time, which improves the foaming efficiency of the foamed material and thus reduces the product cost through time shortening. In addition, due to the migration of the functional additive A, the functional additive A partly migrates to the surface of the foamed material, which can improve the hydrophilicity of the foamed material, thereby improving a bonding strength between the foamed material and an adhesive.

The above examples are provided to explain the present disclosure, rather than to limit the present disclosure. Any modification and change made to the present disclosure within the protection scope of the spirit and claims of the present disclosure should fall into the protection scope of the present disclosure.

What is claimed is:

1. A microporous polyolefin (PO) foamed material, prepared from a PO composition through a foaming process, wherein the PO composition comprises a PO and an additive composition; based on 100 parts by mass of the PO composition, the additive composition accounts for 3 to 20 parts by mass, and the additive composition comprises a functional additive; the functional additive has a molecular formula of R—$(OCH_2CH_2)_xOH$, wherein R is an aralkyl group, a straight alkyl chain, or a branched alkyl chain, the aralkyl group, the straight alkyl chain, or the branched alkyl chain has 5 to 60 carbon atoms, and x is 1 to 20; and an absolute value of a solubility parameter difference between the PO and the functional additive is greater than or equal to 1 $(J/cm^3)^{1/2}$ and less than or equal to 5 $(J/cm^3)^{1/2}$, wherein the PO composition further comprises a second additive, the second additive comprising of lauric acid diethanolamide.

2. The microporous PO foamed material according to claim 1, wherein the PO is polypropylene (PP) or polyethylene (PE).

3. The microporous PO foamed material according to claim 1, wherein the functional additive has the molecular formula of R—$(OCH_2CH_2)_xOH$, wherein R is a straight alkyl chain with 5 to 30 carbon atoms, and x is 1 to 10.

4. The microporous PO foamed material according to claim 1, wherein the functional additive has a molecular weight of 300 g/mol to 1,000 g/mol.

5. The microporous PO foamed material according to claim 1, wherein the absolute value of the solubility parameter difference between the PO and the functional additive is greater than or equal to 1 $(J/cm^3)^{1/2}$ and less than or equal to 3 $(J/cm^3)^{1/2}$.

\* \* \* \* \*